Patented May 9, 1950

2,507,449

UNITED STATES PATENT OFFICE 2,507,449

1-ALKYL-4-HYDROXYPIPERIDINE ESTERS

Henry Martin and Alfred Margot, Basel, Switzerland, assignors to J. R. Geigy A.-G., Basel, Switzerland No Drawing. Original application August 24, 1944, Serial No. 551,073. Divided and this application June 12, 1946, Serial No. 676,332. In Switzerland August 9, 1943

3 Claims. (Cl. 260—294.3)

This application is a division of our copending patent application Ser. No. 551,073, filed on August 24, 1944.

It is known to esterify 4-hydroxypiperidines being substituted in 1-position with benzoic acid and with p-aminobenzoic acid, whereby compounds with local anesthetic effects are obtained (cf. Am. Soc. 51, 922 (1929)). In contradistinction thereto we have now found that esters obtainable from 1-substituted 4-hydroxypiperidines and 1-aryl-cycloaliphatic-1-carboxylic acids possess a surprising strong and manifest efficacy on the parasympathetic nervous system. Besides, the said compounds are distinguished by minimal toxicity which is lower than that of the esters obtainable from corresponding acids and basic alcohols of the diethanol amine type, although the pronounced neurotropic, atropine-like properties of the new compounds are by far increased. The basic esters claimed herein are water-soluble in form of their salts with inorganic or organic acids.

The preparation of the esters is carried out in the usual manner, for instance by causing reactive derivatives of the 1-aryl-cycloaliphatic-1-carboxylic acids i. e. their halides, esters or anhydrides to react with 1-substituted 4-hydroxypiperidines in the presence or absence of condensation agents or by causing reactive esters of the said hydroxypiperidines to react, in some cases in the presence of acid binding agents, with the said acids or their salts respectively.

As reactive esters may be mentioned especially esters with hydrogen halide acids, with aryl sulphonic acids and the like.

As aryl-substituted cycloaliphatic carboxylic acids being suitable for the esterification may be mentioned for example: 1-phenyl-cyclopropyl-1-carboxylic acid, 1-phenyl-1-cyclobutyl carboxylic acid, 1-phenyl-cyclopentyl-1-carboxylic acid, 1-phenyl-cyclohexyl-1-carboxylic acid and so on. These acids and their halides may be prepared according to the method described in the Journal of the American Chemical Society, vol. 56, page 715.

As 1-substituted 4-hydroxypiperidines may be enumerated: 1-methyl-, 1-ethyl- or 1-propyl-4-hydroxypiperidines.

Example 1

10.5 parts of 1-phenyl-cyclopentyl-1-carboxylic acid chloride are added under stirring to 6 parts of 1-ethyl-4-hydroxypiperidine and the mixture is heated, while further stirring, to 160° C. for a short time, whereby with development of heat a clear, bright brown oil is produced, which, advantageously when still warm, is treated with water. The aqueous solution is extracted several times with ether and then the base is freed by means of concentrated ammonia. The base is now extracted with ether and, after having once washed and dried the ethereal solution, the solvent is distilled off. The residue has a boiling point of 144°–145° C. at 0.05 mm. pressure.

Example 2

20.8 parts of 1-phenyl-cyclopentyl-1-carboxylic acid chloride in 200 parts of chlorobenzene are treated, while stirring, with 12 parts of 1-methyl-4-hydroxypiperidine and the whole is subsequently heated to boiling for 2 hours. After cooling the mixture is extracted twice with water and once with dilute hydrochloric acid. The combined aqueous solutions are extracted with ether, the base is made free by means of potassium carbonate and extracted with ether. The ethereal solution is washed with water, dried over potassium carbonate and the solvent is distilled off. The obtained 1-methyl-4-hydroxypiperidine ester of 1-phenyl-cyclopentyl-1-carboxylic acid boils at 139°–140° C. under a pressure of 0.05 mm. From this compound there may be obtained the hydrochloride melting at 179° C.

The following esters may be obtained in the same manner, when using the corresponding acid chlorides: 1-methyl-4-hydroxypiperidine ester of 1-(2'-methylphenyl)-cyclopentyl-1-carboxylic acid, B. P. 0.05 mm. 133°–135° C., and therefrom the hydrochloride melting at 152°–153° C., 1-methyl-4-hydroxypiperidine ester of 1-(3'-methylphenyl)-cyclopentyl-1-carboxylic acid, B. P. 0.07 mm. 132°–134° C. and therefrom the hydrochloride melting at 187°–188° C., 1-methyl-4-hydroxypiperidine ester of 1-(4'-methylphenyl)-cyclopentyl-1-carboxylic acid, B. P. 0.03 mm. 134°–136° C., and therefrom the hydrochloride melting at 241°–242° C., 1-methyl-4-hydroxypiperidine ester of 1-(3':4'-dimethylphenyl)-cyclopentyl-1-carboxylic acid, B. P. 0.05 mm. 143°–144° C., and therefrom the hydrochloride melting at 196°–197° C., 1-methyl-4-hydroxypiperidine ester of 1-phenyl-(2:5-dimethylcyclopentyl)-1-carboxylic acid, B. P. 0.07 mm. 132°–134° C., and therefrom the hydrochloride melting at 91°–92° C., 1-methyl-4-hydroxypiperidine ester of 1-phenyl-cyclobutyl-1-carboxylic acid, B. P. 0.09 mm. 118°–120° C., and therefrom the hydrochloride melting at 213°–214° C., 1-methyl-4-hydroxypiperidine ester of 1-phenyl-cyclopropyl-1-carboxylic acid, B. P. 0.1 mm. 110°–112° C., and therefrom the hydrochloride melting at 174°–176° C.

Instead of the chlorides used in the above examples also other halides or the corresponding anhydrides or reactive esters may be used. Instead of the carboxylic acids and hydroxypiperidines used in the above examples also the other compounds enumerated in the introductory part of this specification can be used. Most of the cited carboxylic acids are known; where this is not the case, the same can be prepared according to the methods which are usual for the known acids.

What we claim is:

1. A 1-alkyl-4-hydroxypiperidine ester of the formula

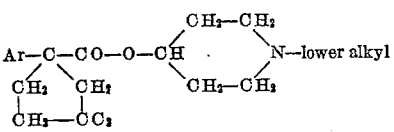

wherein Ar stands for a member selected from the group consisting of phenyl and methylphenyl.

2. An ester of 1-alkyl-4-hydroxypiperidine of the formula

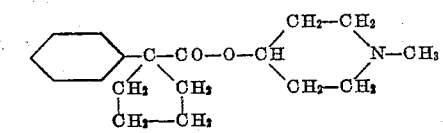

3. An ester of 1-alkyl-4-hydroxypiperidine of the formula

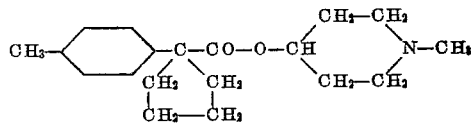

HENRY MARTIN.
ALFRED MARGOT.

REFERENCES CITED

The following references are of record in the file of this patent:

UNITED STATES PATENTS

| Number | Name | Date |
| --- | --- | --- |
| 2,265,184 | Mieicher et al. | Dec. 9, 1941 |
| 2,370,114 | Klemme et al. | Feb. 20, 1945 |
| 2,387,879 | Burtner | Oct. 30, 1945 |

FOREIGN PATENTS

| Number | Country | Date |
| --- | --- | --- |
| 92,589 | Germany | May 24, 1897 |
| 483,258 | Great Britain | Apr. 14, 1938 |
| 532,943 | Great Britain | Feb. 4, 1941 |
| 60,592 | Denmark | Feb. 15, 1943 |

OTHER REFERENCES

Case, Jour. Amer. Chem. Soc., vol. 56 (1934), pages 715–717.

Halpern, Comp, Rend., vol. 126, pages 678 and 679 (1937).

Halpern, Arch int de Pharmacodyn et de Therapie, vol. 59 (1938, pages 149–151).

Burtner et al., Jour. Amer. Chem. Soc., vol. 65, pages 262–267 (Feb. 1943).